United States Patent [19]
Heidel

[11] 3,781,651
[45] Dec. 25, 1973

[54] PROTECTIVE CONTROL CIRCUIT FOR VEHICLE ELECTRICAL SYSTEMS

[75] Inventor: Rodney L. Heidel, Laporte, Ind.

[73] Assignee: Meridian Industries, Inc., Southfield, Mich.

[22] Filed: Nov. 9, 1972

[21] Appl. No.: 305,198

[52] U.S. Cl............... 322/8, 307/10 R, 317/33 R, 317/154
[51] Int. Cl. ............................................. H02j 1/00
[58] Field of Search ............... 307/10 R; 317/33 R, 317/DIG. 6, 154; 322/8; 320/61

[56] References Cited
UNITED STATES PATENTS

| | | | |
|---|---|---|---|
| 3,316,473 | 4/1967 | Pruitt ............................... | 307/10 R |
| 3,676,694 | 7/1972 | Schneider et al. ................ | 307/10 R |
| 3,681,658 | 8/1972 | Naoi et al. ........................ | 307/10 R |

*Primary Examiner*—James D. Trammell
*Attorney*—Gerald E. McGlynn, Jr. et al.

[57] ABSTRACT

A protective control circuit is disclosed for vehicle electrical systems such as those used on trucks and military vehicles. Such electrical systems are provided with a reverse polarity relay for connecting the battery to the generator. When the accessory switch is closed to energize the reverse polarity relay a holding circuit is provided for the relay so that the battery remains connected with the generator even after the accessory switch is opened to shut down the engine. The continued connection of the battery with the generator serves to avoid transient overvoltages which would be damaging to electrical components connected in the system. When the engine and hence the generator stops spinning the battery is disconnected from the generator by disabling the holding circuit.

13 Claims, 1 Drawing Figure

PATENTED DEC 25 1973
3,781,651
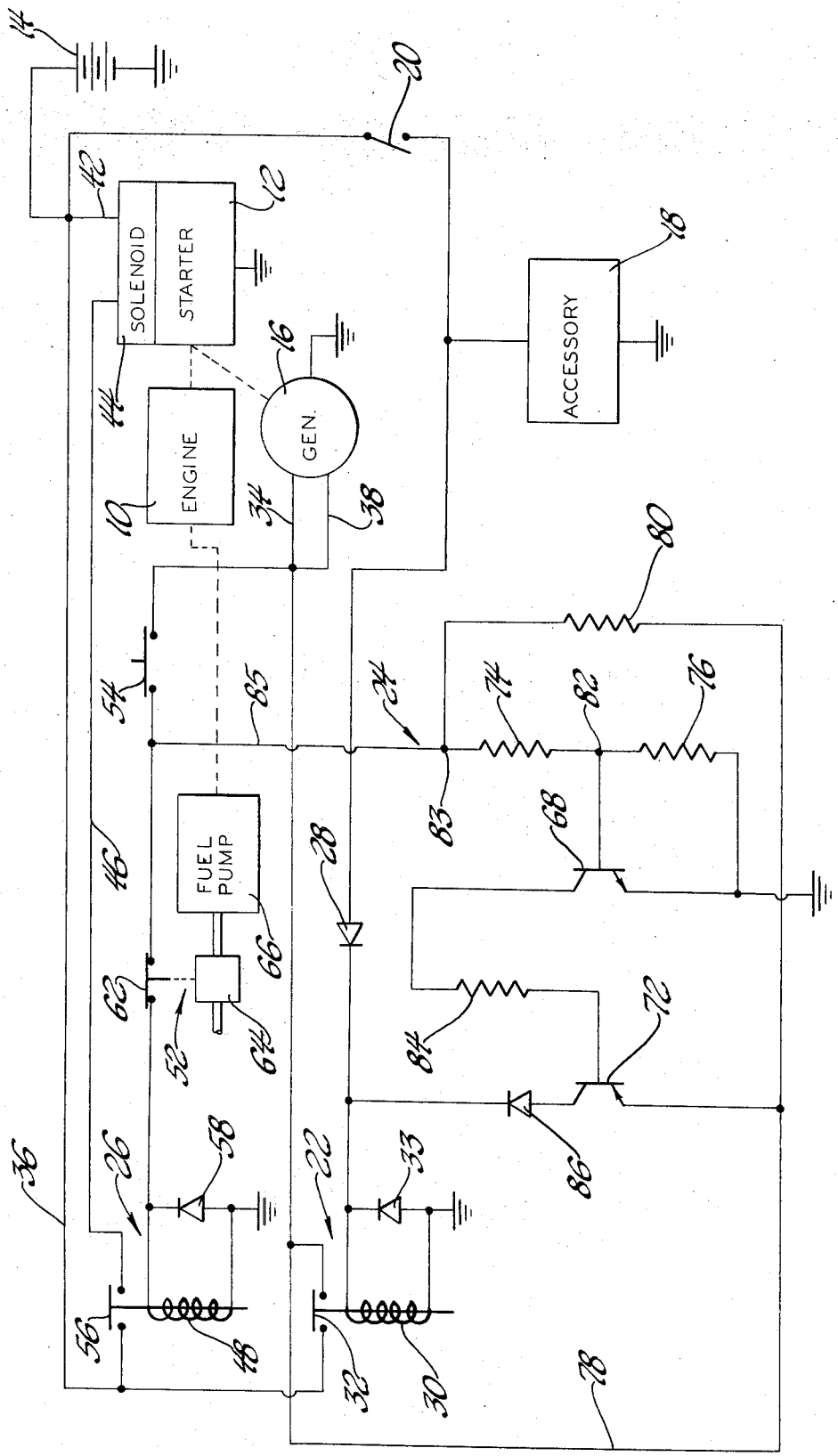

PROTECTIVE CONTROL CIRCUIT FOR VEHICLE ELECTRICAL SYSTEMS

This invention relates to electrical systems for automotive vehicles and more particularly it relates to a protective control circuit for such electrical systems.

In electrical systems for certain vehicles, especially heavy-duty trucks and military vehicles, it is common practice to protect components of the system against inadvertent connection of the battery with reverse polarity. This protection is usually provided by a reverse polarity relay which is operative to connect the vehicle generator with the battery to permit starting of the power plant upon the closure of a control switch. A diode in series with the reverse polarity relay prevents energization thereof if the battery polarity is incorrect, i.e., connected with reverse polarity. Although this protection scheme is very useful it does introduce another operating characteristic in the system which may itself produce serious damage to the components of the system. In operation of such systems with a reverse polarity relay as conventionally provided there is a time interval during shut-down of the engine when the battery is disconnected from the generator by the reverse polarity relay. In this condition a transient overvoltage of significant value is likely to be produced by the generator and, as a consequence, accessory electrical load devices energized from the generator such as a vehicle lamp or radio equipment may be damaged by the overvoltage. This surge of overvoltage results primarily because of the removal of the battery from the generator load circuit in which condition the voltage regulator for the generator is unable to hold the output voltage at the desired value. The overvoltage condition is aggravated if at the time of engine shut-down the generator is operating at heavy load and under such conditions the transient output voltage may be several times the regulated value.

In accordance with this invention this problem of transient overvoltage is eliminated while obtaining the advantages of the reverse polarity protection scheme. This is accomplished by a circuit which maintains the battery connected with the generator whenever the generator is running. For this purpose a protective control circuit is provided for the electrical system which includes a reverse polarity or polarity responsive switching means, preferably in the form of a relay and diode, for connecting the battery to the generator. When a switch is closed to energize the reverse polarity switching means a holding circuit is provided for it so that the battery remains connected with the generator even after the switch is opened to shut down the prime mover. Accordingly transient overvoltage during this interval is avoided by reason of the continued connection of the battery with the generator. When the engine, and hence the generator, stops spinning a sensing device responsive thereto such as a fuel pressure switch disables the holding circuit and the battery is disconnected from the generator. Preferably the holding circuit utilizes a switching transistor stage having an input connected with a bias means and an output connected between the generator and the reverse polarity switching means.

A more complete understanding of the invention may be obtained from the detailed description that follows taken with the accompanying drawings in which:

The single FIGURE is a schematic diagram of the protective control circuit of this invention.

Referring now to the drawing there is shown an illustrative embodiment of the invention in a protective circuit for the electrical system of an automotive vehicle. As the description proceeds it will be apparent that the invention is useful with vehicle electrical systems of the type utilizing a battery, a generator driven by the vehicle prime mover and a reverse polarity relay or other switching means adapted to connect the battery to the generator provided that the polarity is correct. In the illustrative embodiment the invention is employed in the electrical system of a truck having a diesel engine as the prime mover.

In general, as shown in the drawing, the vehicle is provided with a prime mover in the form of a diesel engine 10 which is provided with a starter motor 12 energizable from a storage battery 14. The engine is drivingly connected with a generator 16 adapted to charge the battery and to supply power to an electrical load from the vehicle. The electrical load typically includes the vehicle lamps (not shown) and also includes certain accessories such as radio equipment, heater fan, preheat circuit for the engine and a solenoid valve in the fuel supply. An accessory 18 is connected to the battery through an accessory control switch 20 and of course the accessory may be provided with its own separate control switch. As alluded to above the vehicle electrical system described is conventional and is commonly used in heavy-duty trucks and military vehicles. Such systems are commonly provided with reverse polarity relay energized by the accessory control switch from the battery if the battery polarity is correct. When the reverse polarity relay is actuated the battery is connected with the generator and the starting circuit, including a starting switch and the starting motor, is connected across the battery. In such a conventional system when the engine is shut down by opening the accessory control switch the reverse polarity relay is deactuated and the battery is disconnected from the generator. Consequently the generator will continue to spin until the engine comes to a stop and the generator, without the battery connected thereto will produce excessively high voltage. This overvoltage transient may cause severe damage to the electrical load devices which remain connected with the generator.

In accordance with this invention the electrical system is provided with a protective control circuit for the load devices connected in the system. This protective control system, in general, comprises a reverse polarity switching means or relay 22 adapted to be actuated from the battery by the accessory control switch 20. The relay 22 connects the battery to the generator and is latched or held actuated by a holding circuit 24 which maintains the relay 22 energized so long as the engine is spinning. The protective control circuit also includes a starter relay 26 which is deenergized after the engine is started to insure disengagement of the starter drive.

Referring now to the circuit in greater detail the battery 14 has its negative terminal connected to ground and its positive terminal is connected through the accessory control switch 20 to one terminal of the accessory 18 which has its other terminal connected to ground. The positive terminal of the battery is also connected through the control switch 20 and through a diode 28, from anode to cathode, to the reverse polarity switching means or relay 22. The reverse polarity relay comprises an energizing coil 30 having one terminal connected with the cathode of the diode 28 and the other terminal connected to ground. The relay 22 also includes normally open switch contacts 32 i.e. the contacts are open when the winding 30 is not energized and the contacts are closed when the winding is energized to actuate the relay. A diode 33 is connected across the winding 30 to bypass inductive voltages which result from deenergization of the relay.

The generator 16 is a DC generator having its positive output terminal connected with a supply voltage conductor 34 and its negative terminal connected to ground. The supply voltage conductor 34 is connected through the switch contacts 32 of the reverse polarity relay and a supply voltage conductor 36 to the positive terminal of the battery. The field winding of the generator is connected through a conductor 38 to the supply voltage conductor 34. The generator 16 preferably takes the form of an alternator of the revolving field type with a polyphase stator winding and a full wave rectifier connected thereto to supply the dc voltage at the output terminal.

The starter motor 12 is energizable directly from the battery 14 and has one terminal connected to ground and another terminal connected to the positive supply line 36 through a conductor 42 and the switch contacts (not shown) of the starter solenoid 44. The starter solenoid 44 also has one terminal connected to ground and the other is connected through a conductor 46 and the starter relay 26 to the positive supply voltage conductor 36. The starter relay comprises an energizing coil 48 having one terminal connected to ground and the other terminal connected through a fuel pressure switch 52 and a starting switch 54 to the positive supply voltage conductor 34. The starter relay 26 also includes switch contacts 56 which are normally open and connected between the supply voltage conductor 36 and the conductor 46. A diode 58 is connected across the winding 48 for transient protection. The starting switch 54 is manually actuated and is normally open. The condition responsive or pressure actuated switch 52 comprises a set of normally closed switch contacts 62 which are actuatable by a fluid pressure actuator 64 in the fuel line of the vehicle fuel pump 66. The fuel pump is driven by the engine 10 and when the engine is running at idle speed or greater the switch 52 is actuated to open the contacts 62 to deenergize the starter relay 26.

The holding circuit 24 comprises a switching transistor stage including a first transistor 68 and a second transistor 72, the transistors being connected in cascade. An input bias circuit includes voltage dividing resistors 74 and 76 connected in series between the positive supply voltage line 34 through a conductor 78 and a series resistor 80 to ground. The transistor 68 is of the NPN type and has its base connected to the bias circuit at the junction 82 of resistor 74 and 76. The input of transistor 68 is completed by connection of the emitter to ground. The output of the transistor 68 between emitter and collector is connected to the input of the transistor 72 which is of the PNP type. This is provided by connecting the collector of transistor 68 to the base of transistor 72 through the coupling resistor 84. The output of the switching transistor 72 which extends between the emitter and collector is connected across the winding 30 of the reverse polarity relay and a battery. This is provided by connecting the collector of transistor 72 through a blocking diode 86 to the upper terminal of the winding 30 and connecting the emitter through the reverse polarity relay contacts 32 and supply voltage conductor 36 to the battery. The bias circuit is connected from a junction 83 between resistor 74 and 80 through a conductor 85 to ground through the fuel pressure switch 62 and the starter relay winding 48. As will appear hereinafter this provides an enabling and disabling circuit for the bias circuit.

The operation of the protective control circuit will be described with reference to the drawing. In order to start the engine the accessory control switch 20 is manually closed and, assuming the battery 14 is connected with the correct polarity for the electrical system, the reverse polarity relay 22 will be actuated. If the polarity is incorrect the relay 22 will remain deactuated and the engine cannot be started until the battery polarity is corrected. When the reverse polarity relay 22 is actuated the switch contacts 32 are closed and the battery 14 is connected with the generator 16 so that the supply voltage line 34 is provided with the positive battery voltage. Closure of the manual starting switch 54 causes the starter relay 26 to be actuated through the normally closed fuel pressure switch contacts 62. Actuation of the starter relay 48 causes the switch contacts 56 thereof to close and the battery voltage from the supply voltage conductor 36 is applied to the solenoid 44 which closes the contacts (not shown) between the positive terminal of the battery and the starter motor 12. The starter motor is thus energized and the engine is cranked thereby for starting purposes. As soon as the engine starts the fuel pump 66 will develop a sufficient pressure to cause the pressure actuator 64 to open the pressure switch contacts 62. This deenergizes the winding 48 of the starter relay 26 and thereby deenergizes the starter motor 12.

The holding circuit 24 is enabled by connection of the bias circuit at the junction 83 to the positive supply voltage. During engine starting and running, battery voltage from the supply voltage conductor 36 is applied through the reverse polarity relay contacts 32 and the conductor 78 and resistor 80 to the junction 83. During starting, the junction 83 is also connected through conductor 85 to the battery. During starting and running the bias circuit comprising resistors 74 and 76 develops sufficient positive voltage at the junction 82 to render the transistor 68 conductive. Accordingly transistor 72 is conductive and the holding circuit is turned on. With the engine running the pressure switch contacts 62 and the starter switch contacts are open but this leaves the junction 83 connected to the battery through conductor 78 and the bias circuit remains enabled and the holding circuit remains turned on. Accordingly the switching transistor 72 connects the supply voltage from conductor 78 through the blocking diode 86 across the energizing winding 30 of the reverse polarity relay and holds the relay actuated with the contacts 32 closed. This condition of the protective control circuit will be maintained as long as the engine is running.

When the engine is to be shut down the control switch is opened and thus the battery voltage is no longer supplied through the switch and the diode 28 to the energizing coil 30 of the reverse polarity relay. However so long as the engine continues to spin at a speed higher than a predetermined value after its fuel supply (or ignition, in the case of a spark ignited engine) is shut off, the fuel pump 66 will continue to deliver pressure to the actuator 64 and the pressure switch 62 will remain open. Accordingly the bias circuit of the holding circuit 24 remains enabled and the switching transistor 72 remains conductive and the battery voltage is applied through the switch contacts 32 to the energizing winding 30 of the reverse polarity relay which maintains the battery connected with the generator. Even though the opening of the switch 20 may have removed a substantial electrical load from the generator no significant overvoltage will be developed thereby because of the effect of the battery being connected to the generator output. Not until the fuel pressure switch contacts 62 are opened will the holding circuit 24 be turned off, allowing the relay 22 to be deactuated and thus disconnect the battery from the generator. This occurs because closing of the switch contacts 62 disables the bias circuit of the holding circuit by connecting the junction 83 to ground through the winding 48. Thus the transistor 68 is rendered nonconductive and the switching transistor 72 is cut off to deactuate the reverse polarity relay 22 and open the switch contacts 22. At this point the engine is spinning below the aforementioned predetermined speed and the generator speed is too low to product a damaging overvoltage. In this manner the electrical system is protected from any overvoltage transients which might be damaging to the components of the system.

Although the description of this invention has been given with reference to a particular embodiment it is not to be construed in a limiting sense. Many variations and modifications will now occur to those skilled in the art. For a definition of the invention reference is made to the appended claims.

The embodiments of the invention in which an exclusive property or privilege is claimed are defined as follows:

1. For use with a vehicle including a prime mover and having an electrical system of the type which includes a battery, a generator electrically connectable to said battery and driven by said prime mover, manually actuated switching means in circuit with said battery, electrically actuated switching means connected with said manually actuated switching means and adapted when actuated to a first condition to connect the battery to the generator, the improvement comprising a holding circuit for said electrically actuated switching means to hold it in said first condition, and condition responsive switching means connected with said holding circuit and being responsive to running of said prime mover for enabling said holding circuit and operative to disable the holding circuit when the prime mover stops whereby the battery remains connected to the generator after said manually actuated switching means are deactuated so long as the prime mover and generator are running.

2. The invention as defined in claim 1 wherein said electrical system includes at least one electrical load device, said manually actuated switching means includes first switching contacts for connecting said load device and the electrically actuated switching means to the battery and includes second switching contacts for starting the prime mover.

3. The invention as defined in claim 2 including a diode in series with said electrically actuated switching means to prevent actuation thereof when the battery is connected with the wrong polarity.

4. The invention as defined in claim 3 wherein said prime mover is an engine, a starter motor connected with the engine, said second switching contacts being adapted to energize said starter motor to crank said engine.

5. The invention as defined in claim 4 including a starter relay connected between said second switching contacts and said battery through said electrically actuated switching means.

6. The invention as defined in claim 5 wherein said engine is provided with an engine driven fuel pump, and wherein said condition responsive switching means is a fluid responsive pressure switch operatively connected with the fluid outlet of said pump.

7. The invention as defined in claim 6 wherein said electrically actuated switching means has an input connected between the first switching contacts and the battery and has an output connected between the battery and the generator, said electrically actuated switching means being actuated to the first condition when the first switching contacts are actuated.

8. The invention as defined in claim 7 wherein said electrically actuated switching means comprises a relay having an energizing winding constituting said input and having switching contacts constituting said output.

9. The invention as defined in claim 2 wherein said holding circuit comprises second electrically actuated switching means having an input connected in a circuit with the battery when the first mentioned electrically actuated switching means connects the battery to the generator and having an output connected across the input of the first mentioned electrically actuated switching means.

10. The invention as defined in claim 8 wherein said holding circuit comprises at least one switching transistor having an input and an output, bias means connected with said battery when the first mentioned electrically actuated switching means connects the battery to said generator, said input of the transistor being connected to said bias means, the output of said transistor being connected with said energizing winding of said relay, said pressure responsive switch being connected across said bias means through the winding of said starter relay and being open when said engine is running whereby said holding circuit is enabled said pressure responsive switch being closed when said engine is stopped thereby shunting said bias means and disabling said holding circuit to deactuate the reverse polarity relay and disconnect said battery from said generator.

11. The invention as defined in claim 8 wherein said engine is a diesel engine and wherein at least one electrical load device must be energized from said battery before said engine is started.

12. The invention as defined in claim 11 wherein said holding circuit comprises second electrically actuated switching means having an input connected in a circuit with the battery when the first mentioned electrically actuated switching means connects the battery to the generator and having an output connected across the input of the first mentioned electrically actuated switching means.

13. The invention as defined in claim 12 wherein said holding circuit comprises first and second transistors each having an input and an output and being connected in cascade, said bias means being connected to said generator and the input of the first transistor being connected to said bias means, the output of said second transistor being connected between said generator and said energizing winding of the reverse polarity relay whereby said reverse polarity relay is held actuated, and a diode connected in the output of said second transistor between the transistor and said energizing coil to block reverse polarity voltage from said second transistor.

* * * * *